United States Patent
Recksiek et al.

(10) Patent No.: US 8,868,261 B2
(45) Date of Patent: Oct. 21, 2014

(54) MONITORING DEVICE FOR AN ACTUATION SYSTEM OF AN AIRCRAFT, ACTUATION SYSTEM AND METHOD FOR RECONFIGURING THE ACTUATION SYSTEM

(71) Applicant: Airbus Operations GmbH, Hamburg (DE)

(72) Inventors: Martin Recksiek, Hamburg (DE); Mark Heintjes, Weyhe (DE); Christoph Winkelmann, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/790,960

(22) Filed: Mar. 8, 2013

(65) Prior Publication Data
US 2013/0261852 A1 Oct. 3, 2013

Related U.S. Application Data

(63) Continuation of application No. PCT/EP2011/004527, filed on Sep. 8, 2011.

(60) Provisional application No. 61/382,824, filed on Sep. 14, 2010.

(30) Foreign Application Priority Data

Sep. 8, 2010 (DE) .................... 10 2010 044 678

(51) Int. Cl.
*G01C 23/00* (2006.01)
*B64C 13/30* (2006.01)
*B64C 13/24* (2006.01)
*B64D 45/00* (2006.01)

(52) U.S. Cl.
CPC ............. *B64C 13/24* (2013.01); *B64C 13/30* (2013.01); *B64D 45/0005* (2013.01)
USPC ................ 701/3; 701/14; 701/29.2; 244/75.1

(58) Field of Classification Search
USPC ........ 701/3, 14–16, 31.4, 29.2; 244/75.1, 203
See application file for complete search history.

(56) References Cited

U.S. PATENT DOCUMENTS

| 7,195,209 | B2* | 3/2007 | Schievelbusch | 244/215 |
| 7,293,959 | B2* | 11/2007 | Pedersen et al. | 416/23 |
| 8,033,500 | B1* | 10/2011 | Charafeddine et al. | 244/75.1 |
| 2012/0312931 | A1* | 12/2012 | Recksiek et al. | 244/203 |

FOREIGN PATENT DOCUMENTS

| DE | 33 08 301 | 9/1984 |
| DE | 10 2008 052 754 | 5/2010 |
| DE | 10 2010 044 678.5 | 3/2012 |

(Continued)

OTHER PUBLICATIONS

German Office Action for Application No. DE 2010 044 678.5 dated Mar. 12, 2014.

*Primary Examiner* — Gertrude Arthur Jeanglaude
(74) *Attorney, Agent, or Firm* — Jenkins, Wilson, Taylor & Hunt, P.A.

(57) ABSTRACT

A monitoring device is disclosed for an actuation system of an aircraft for monitoring a guiding device of a regulating flap with a load sensor. An actuation system with the monitoring device and a method for reconfiguring such an actuation system are disclosed. The monitoring device includes an interface to the load sensor and an interface to a driving device for adjusting the regulating flap. The monitoring device can determine or receive in-flight information actively signaling a predefined flight attitude and/or a predefined operational state of the aircraft. The monitoring device can compare a load value corresponding to a sensor value acquired by the load sensor and a limiting value corresponding to a minimum operational load for the predefined flight attitude and/or the predefined operational state of the aircraft and a monitoring function. The monitoring function can assign a fault mode to the regulating flap.

21 Claims, 6 Drawing Sheets

(56) References Cited

FOREIGN PATENT DOCUMENTS

| | | |
|---|---|---|
| EP | 1 524 188 | 4/2005 |
| EP | 1 604 896 | 12/2005 |
| EP | 2 251 258 | 11/2010 |
| WO | WO 2005/024273 | 3/2005 |
| WO | WO 2012/031759 | 3/2012 |

* cited by examiner

MONITORING DEVICE FOR AN ACTUATION SYSTEM OF AN AIRCRAFT, ACTUATION SYSTEM AND METHOD FOR RECONFIGURING THE ACTUATION SYSTEM

CROSS-REFERENCE TO RELATED APPLICATIONS

This application is a continuation of and claims priority to PCT Application No. PCT/EP2011/004527, filed Sep. 8, 2011, which claims priority to German Patent Application serial No. DE 10 2010 044 678.5, filed Sep. 8, 2010, and to U.S. Provisional Application Ser. No. 61/380,824, filed Sep. 8, 2010, the disclosures of which applications are incorporated by reference herein.

TECHNICAL FIELD

The invention pertains to a monitoring device for an actuation system of an aircraft, an actuation system, in particular, for a fault-tolerant aircraft regulating flap system and a method for reconfiguring the actuation system.

BACKGROUND

The actuation system comprises at least one adjustable regulating flap on each airfoil, wherein the regulating flap may generally comprise an adjustable aerodynamic flap of an aircraft, particularly a high-lift flap. The actuation system may comprise, in particular, a high-lift system of an aircraft.

Landing flap systems with a central drive and a central torsional shafting for actuating the adjusting devices for adjusting a flap are known from the general state of the art. The shafting transmits the mechanical driving power from a central driving motor to the actuators that move the flaps. If the adjusting devices seize, for example, it needs to be ensured that the driving power is no longer transmitted to the regulating flap. It is known to utilize a load sensor for detecting such instances.

Other sensors and, in particular, position sensors are used on the regulating flap in order to detect other types of faults and, in particular, a load path interruption occurring on a guiding device. However, the quality of such a fault detection largely depends on the design of the actuation kinematics of the regulating flap and the stiffness of the actuation system and, in particular, of the regulating flap.

US P 195 209 discloses a load sensor for drives of high-lift systems that measures the load at the output of an actuator and detects an overload in order to passivate the drive system as a consequence thereof.

DE 33 08 301 B3 discloses a high-lift system with a drive system, elements for transmitting the driving energy over the entire wingspan at driving stations of individual segments of landing flap/slat flap systems and an overload protection comprising electric load sensors that are arranged at the points, at which the driving energy of the respective gear mechanism is introduced into the flap body, i.e., at the transfer point of the driving energy on the output lever of the gear mechanism.

EP 1 604 896 A1 describes an overload protection for a high-lift system.

Documents EP 1 524 188 A2 and WO 2005/024273 A1 describe a device for detecting an actuator blockage by identifying an overload.

SUMMARY

It is the objective of the invention to make available a monitoring device for an actuation system of an aircraft or such an actuation system of an aircraft, as well as a method for reconfiguring the actuation system, by means of which a reconfiguration can be realized with simple means if critical faults of the actuation system occur.

This objective is achieved with the features of the independent claims. Other embodiments are disclosed in the dependent claims that refer to the aforementioned independent claims.

According to the invention, a monitoring device for an actuation system of an aircraft is proposed, wherein said monitoring device comprises a function for monitoring a guiding device of a regulating flap with a load sensor. The monitoring device may also comprise, in particular, a control and monitoring device. The monitoring device comprises: an interface to the load sensor and an interface to a driving device for adjusting the regulating flap. According to the invention, the monitoring device is realized in such a way that it determines or receives in-flight information as to the fact that a predefined flight attitude and/or a predefined operational state of the aircraft respectively exist or exists. Furthermore, the monitoring device particularly comprises: a comparing function for carrying out a comparison between a load value that corresponds to a sensor value acquired by the load sensor and a limiting value that corresponds to a minimum operational load for the predefined flight attitude and/or the predefined operational state of the aircraft. The monitoring function is realized, in particular, in such a way that, if it is detected that the predefined flight attitude and/or the predefined operational state exist or exists, the monitoring function assigns a fault mode to the regulating flap as a result of the comparison showing that the limiting value corresponding to the minimum operational load is not reached.

The monitoring device or the monitoring function may furthermore be realized in such a way that the predefined flight attitude and/or operational state of the aircraft is considered to exist if at least one of the following conditions is fulfilled:

the monitoring function determines or receives in-flight information as to the fact that the regulating flap is and/or has been moved into one of several selectable positions that is specially predefined for the assignment of the fault mode and/or at least a predefined time after generating an actuation command for the driving device in order to move the regulating flap into one of several selectable positions that is specially predefined for the assignment of the fault mode and/or the monitoring function determines or receives in-flight information as to the fact that a predefined aerodynamic angle of attack or loading state or flight weight exists.

In this case, the monitoring function or another aircraft system function such as, e.g., a control function may determine that the regulating flap is and/or has been moved into one specially predefined position of a variety of possible positions based on the values of position sensors or proximity sensors.

In the alternative condition, in which the comparison between a load value that corresponds to a sensor value acquired by the load sensor and a limiting value that corresponds to a minimum operational load is carried out a predefined time after generating an actuation command for the driving device in order to move the regulating flap, this time may be adjusted in such a way that the acquisition of the load value by means of the load sensor takes place before the specially predefined position is reached, i.e., while the regulating flap is still moving into the specially predefined position. The load value may be alternatively or additionally acquired by means of the load sensor after the specially predefined position is reached, i.e., after the regulating flap has been moved into the specially predefined position. Frictional effects can be compensated to a certain degree, in particular, by acquiring a load value during the movement of the regulating flap.

The inventive monitoring device may be realized, in particular, in such a way that it carries out the monitoring function once during each flight.

The inventive monitoring device may be alternatively or additionally realized, in particular, in such a way that it carries out the monitoring function during the approach phase. This is particularly advantageous in instances, in which the regulating flap comprises a high-lift flap that is extended relatively far or completely extended in certain types of aircraft such that the greatest loads act upon the regulating flap in this flight phase.

In the alternative condition, in which the comparison between a load value that corresponds to a sensor value acquired by the load sensor and a limiting value that corresponds to a minimum operational load is carried out when the aircraft assumes a predefined flight attitude and/or operational state, the monitoring function may determine this flight attitude itself during the flight or the information may be determined by another system function that is functionally connected to the monitoring function and received by said monitoring function.

The flight attitude may be defined, in particular, by a flying speed or a flying speed range or an aerodynamic angle of attack or an angle of attack range. According to another embodiment of the invention, the fact that a predefined flight attitude exists as a result of the comparison may be specified in that the aircraft speed lies within a predefined speed range and the aircraft altitude lies within a predefined altitude range and/or the aerodynamic angle of attack lies within a predefined angle of attack range.

The operational state of the aircraft may consist of a loading state, i.e., particularly the flight weight or a flight weight range.

The predefined flight attitude and/or operational state may be defined, i.e., specified, in connection with the determination of a certain position of the regulating flap or an adjusting range of the regulating flap or the movement of the regulating flap into a predefined position.

In this case, the monitoring function may be realized in such a way that it also utilizes combinations of one or more of the aforementioned or different states of flight or operational states of the aircraft in order to carry out the acquisition of the load values and a limiting value that corresponds to a minimum operational load when these states exist.

According to the invention, a monitoring and fault detecting function is activated when relatively high aerodynamic loads occur on the regulating flap, wherein this makes it possible to define a limiting value for a load value that, when it is not reached, can be is reliably interpreted as a fault in a guiding device of a regulating flap. For this purpose, the measurement proposed in accordance with the invention may be carried out exactly in a flight attitude or flight phase in question. The flight phase may consist, in particular, of the approach phase prior to the final approach or the final approach phase.

In this case, the control and/or monitoring device for carrying out the fault detection may be realized in such a way that it activates the fault detecting function during a flight and, in particular, during each flight.

According to the invention, the control and monitoring device also may activate the fault detecting function analogously when an actuation command for moving the regulating flap is generated or when it is determined that a predefined flight attitude exists.

The monitoring device may also be realized in such a way that the control and monitoring device determines that a predefined flight attitude exists by comparing specified flight attitude data with acquired flight attitude data.

In the inventive monitoring device, the limiting value that corresponds to a minimum operational load may have the value of a cruising load at the location of the load sensor that is acquired during the same flight by means of the at least one load sensor.

According to an inventive embodiment, it is proposed that the control and/or monitoring device is realized in such a way that, if a fault mode is assigned to a regulating flap, it no longer activates this regulating flap during the same flight. According to the invention, the control and/or monitoring device may, if a fault mode is assigned to a guiding device, transmit a nominal command to the guiding devices assigned to the control and monitoring device, wherein said nominal command corresponds to the adjustment of a position of the guiding device that was determined as the actual position by a position sensor for acquiring the adjusted position of the regulating flap. In this case, the actuator therefore is frozen in its position.

According to the invention, an actuation system of an aircraft is proposed that comprises, in particular, a guiding device for a regulating flap with a load sensor and a monitoring device with a function for monitoring the guiding device, wherein an interface to the load sensor and an interface to a driving device for adjusting the regulating flap are integrated into the monitoring device, wherein the monitoring device is realized in such a way that it determines or receives in-flight information that actively signals a predefined flight attitude and/or a predefined operational state of the aircraft, wherein the monitoring device comprises a comparing function for carrying out a comparison between a load value that corresponds to a sensor value acquired by the load sensor and a limiting value that corresponds to a minimum operational load for the predefined flight attitude and/or the predefined operational state of the aircraft, and wherein the monitoring function is realized in such a way that it assigns a fault mode to the regulating flap if it is determined that the predefined flight attitude and/or the predefined operational state of the aircraft exists as a result of the comparison showing that the limiting value corresponding to the minimum operational load is not reached.

According to another aspect, a monitoring device for such an actuation system is proposed.

The invention proposes, in particular, an actuation system for a fault-tolerant aircraft regulating flap system that comprises:

regulating flaps, at least one of which is respectively arranged in an adjustable fashion on each airfoil of the aircraft, at least one driving device for adjusting the regulating flaps, and at least two guiding devices that are coupled to each regulating flap and spaced apart from one another in the wingspan direction of the regulating flap in order to adjust the regulating flap, wherein each guiding device comprises: an actuator, a transmission mechanism for transmitting the power of the respectively assigned driving device and an actuation mechanism for kinematically coupling the actuator to the regulating flap, a monitoring device according to the invention that is centrally or decentrally arranged in the aircraft and functionally connected to the at least one driving device in order to adjust the guiding device.

At least one of the guiding devices of a flap may feature: a load sensor that serves for acquiring the load occurring in the respective guiding device and is functionally connected to the monitoring device in order to receive the sensor values acquired by the load sensors. The monitoring device is realized, in particular, in accordance with one of the inventive embodiments.

In this case, the control and monitoring device may be realized, in particular, in such a way that, if a fault mode is assigned to a regulating flap, it no longer activates this regulating flap during the same flight.

In addition, the limiting value that corresponds to a minimum operational load may be specified in the form of a value that is lower than 70% of the permissible maximum load for flying operations at the location of the load sensor. This range may also lie between 10% and 70%.

The inventive monitoring device may also be realized in the form of a control and monitoring device and in such a way that, if a fault mode is assigned to a regulating flap, it no longer activates this regulating flap during the same flight.

According to another embodiment of the invention, the monitoring device is realized in such a way that the comparing function carries out a comparison between a sensor value acquired by the load sensor and a limiting value that corresponds to a minimum operational load, as well as a comparison between a sensor value acquired by the load sensor and a second limiting value that corresponds to a maximum operational load, wherein the monitoring function is realized in such a way that the monitoring function assigns a fault mode to the regulating flap if it is determined, that the predefined flight attitude and/or the predefined operational state of the aircraft exists as a result of the comparison showing that the limiting value corresponding to the minimum operational load is not reached or the limiting value corresponding to the maximum operational load is exceeded.

In this case, the first limiting value corresponding to a minimum operational load and the limiting value corresponding to a maximum operational load may be respectively specified in such a way that the first limiting value amounts to less than half of the second limiting value for the maximum operational load or that the second limiting value is 100 to 150% greater than the first limiting value or that the first limiting value amounts to one-third to one-fifth of the second limiting value.

According to an embodiment of the invention, the load sensor comprises a sensor for measuring the longitudinal force occurring in a drive rod along its longitudinal direction, i.e., in the load path between the actuator and the regulating flap of the respective adjusting device. In this case, the sensor acquires a value that is analogous to this longitudinal force such as, e.g., an extension or a deformation of the drive rod.

According to an exemplary embodiment of the inventive actuation system, it is proposed that the load sensor comprises at least one strain gauge that is arranged on the drive rod. In this case, the at least one strain gauge may be arranged on the outer side of the drive rod. Alternatively or additionally, the drive rod may be at least sectionally realized in the form of a hollow body with an interior and the at least one strain gauge may be arranged on the inner side of the interior of the drive rod. In these embodiments, the at least one strain gauge may be detachably arranged on the drive rod.

According to an embodiment of the invention, the drive rod is composed of a first drive rod section that is coupled to the actuator lever, a second drive rod section that is coupled to the regulating flap and arranged behind the first drive rod section referred to the longitudinal direction of the drive rod, and a sensor that acquires the force occurring between the first and the second drive rod section or a relative movement between the first and the second drive rod section or a value analogous thereto in order to determine the longitudinal force occurring in the load path between the actuator and the regulating flap of the respective adjusting device.

According to an embodiment of the invention, it is proposed that the drive rod is composed of a first drive rod section that is coupled to the actuator lever, a second drive rod section that is coupled to the regulating flap and a cross bolt that couples these drive rod sections to one another, wherein the drive rod sections are arranged such that they partially overlap one another and an overlapping region is formed, and wherein the cross bolt extends through the drive rod sections transverse to the longitudinal direction of the drive rod in their overlapping region in order to couple the drive rod sections to one another in a force-transmitting fashion. In this case, the load sensor comprises a sensor that is arranged on the cross bolt and serves for acquiring lateral forces that act upon the bolt as a result of longitudinal forces occurring in the drive rod.

The two drive rod sections may be realized in a tubular fashion and guided relative to one another.

In this case, the load sensor in the form of a strain gauge may, in particular, be realized in such a way that it measures an extension occurring on the surface of the cross bolt or a housing accommodating this cross bolt as a result of the force exerted upon the connecting bolt by the regulating flap. The strain gage may be arranged on a surface on the outer side or the inner side of the cross bolt or the joint housing in such a way that it covers part of the circumference referred to the center axis of the cross bolt and, in particular, the region, in which the greatest tensions are expected to occur in the respectively adjusted positions of the predefined adjusting range of the regulating flap.

According to an exemplary embodiment of the invention, the load sensor comprises at least one strain gauge that is arranged on a surface of the cross bolt. In this case, the connecting bolt may be realized in the form of a hollow bolt and the strain gauge may be arranged on the surface of the inner bore, i.e., the inner surface of the cross bolt. The strain measuring device may be composed of one or more strain gauges that may be arranged, e.g., in the form of a full bridge arrangement. The load sensor may generally be realized in the form of a temperature-compensated arrangement of sensor components. Alternatively, the load sensor may consist of a load cell.

The inventive solution is particularly advantageous in an actuation system, in which the drive rod has an adjustable length in order to adjust the actuation kinematics with respect to predefined positions of the regulating flap such as, e.g., the position of the retracted regulating flap. In this case, it would be conceivable, in particular, to adjust the length of the drive rod by means of a thread.

According to another embodiment of the invention, it is proposed that the drive rod is composed of a first drive rod section that is coupled to the actuator lever, a second drive rod section that is coupled to the regulating flap and a coupling device that couples these drive rod sections to one another. In this case, the coupling device may be realized in such a way that it allows a relative movement between the first and the second drive rod section. The coupling device comprises a load sensor for acquiring longitudinal forces that occur in the drive rod. The coupling device couples the drive rod sections to one another in a force-transmitting fashion and may feature, in particular, a pretensioning device and/or a damping device, into which the load sensor for determining longitudinal forces is integrated. In this case, the load sensor may consist, in particular, of a load cell.

The arrangement of the load sensor in accordance with the invention makes it possible to detect critical faults of the actuation system with the reliability required for a safety-critical system, but threshold values for the load sensor that are sufficiently accurate in this respect need to be specified for this purpose.

According to an embodiment of the invention, it is proposed that the load sensor of at least one adjusting device is connected to a control and/or monitoring device assigned to the adjusting device by means of a signal line in order to transmit the sensor signals generated by the load sensor, wherein said signal line extends from the load sensor into the regulating flap and from there into the main wing along one of the bearing devices and ultimately to the control and monitoring device. Although this measure may lead to greater cable lengths than in the state of the art, a cable routing via or through the actuator can be avoided in this way and realized such that it is easier to maintain and also more reliable. In addition, this cable routing makes it possible to achieve a superior protection of the cable against atmospheric influences.

The control and monitoring device may feature a fault detecting function that is realized such that it assigns a fault mode to an adjusting device with a load sensor if it determines that a respective limiting value of an operational load is not reached or exceeded based on the sensor signals received from the load sensor.

The design of the inventive system, i.e., the embodiments of the invention, make it possible to detect, among other things, the following safety-critical faults of the actuation system according to the invention in an advantageous fashion, i.e., reliably, efficiently and without requiring structural reinforcement measures, by means of corresponding functions of the control and monitoring device:

- an interruption of the load path in one of the guiding devices of a regulating flap, wherein such an interruption of the load path may be the result, in particular, of a fracture of a force-transmitting section of the drive train between the driving device and the regulating flap or adjacent structural components;
- an interruption of the load path in one of the guiding devices of a regulating flap in combination with a blockage in the actuator or significant friction in the actuator of the same guiding device.

In the first-mentioned fault scenario, i.e., when the load path in one of the guiding devices of a regulating flap is interrupted without blockage of the actuator or significant friction in the actuator, the regulating flap has an additional mobility at the location of this guiding device, i.e., another degree of freedom of motion relative to the main wing, while the driving torque of the driving device is still transmitted to the regulating flap in the other guiding device assigned to the same regulating flap. The aerodynamic loads that occur in-flight and are applied to the regulating flap act in the defective guiding device. If a load sensor is only arranged on one of the guiding devices assigned to a regulating flap, an interruption of the load path on this guiding device causes the load sensor to measure a load value that is much lower than the load value in the state, in which no defective guiding device is assigned to the same regulating flap.

According to another aspect of the invention, an actuation system for a regulating flap of an aircraft is proposed, wherein the actuation system comprises:
  at least one driving device for adjusting regulating flaps,
  at least two guiding devices that are spaced apart from one another in the wingspan direction of the regulating flap and serve for adjusting the regulating flaps, wherein each guiding device comprises: an actuator, a transmission mechanism for transmitting the power of the respectively assigned driving device and an actuation mechanism for kinematically coupling the actuator to the regulating flap,
  at least one load sensor on at least one regulating flap of the actuation system and on at least one guiding device,
  a monitoring device according to an embodiment of the invention that is functionally connected to the at least one driving device in order to adjust the guiding devices.

The load sensor may be arranged on at least one regulating flap of the actuation system, particularly on the guiding device that is situated closest to the aircraft fuselage, because greater loads occur on this guiding device than on the guiding device situated farther from the aircraft fuselage in a majority of aircraft types.

The actuation system may feature, in particular, at least two regulating flaps on each airfoil, wherein a first load sensor is arranged on the regulating flap situated closest to the fuselage, namely on the guiding device situated closest to the aircraft fuselage, and wherein a second load sensor is arranged on the regulating flap situated farthest from the fuselage, namely on the guiding device situated farthest from the fuselage.

According to an additional development of the invention, an embodiment of the actuation system is proposed, in which not only the aforementioned comparing function is carried out, but also a comparison between a load value that corresponds to a sensor value acquired by the load sensor assigned to a regulating flap and a first limiting value that corresponds to a minimum operational load, wherein a fault mode is assigned to the regulating flap if this limiting value is not reached. This comparing function makes it possible to detect a load path interruption occurring on the guiding device that is not provided with the load sensor. If the load path interruption occurs on the guiding device that is not provided with the load sensor, the load sensor would not measure an insufficient load, but rather an excessive load. This requires a load sensor with a suitable level of accuracy that is able to measure this overload in a given kinematic design of the actuation system and, in particular, the corresponding stiffness of the regulating flap. According to the invention, however, this monitoring and comparing function may also be realized with only one guiding device of the actuation system and only one load sensor.

According to another embodiment of the invention, the load sensor for detecting a load path interruption may be provided on the guiding device of a regulating flap, on which no additional load sensor is arranged. This may be the case, in particular, if other monitoring functions such as, e.g., the monitoring of loads on the flap are realized with the load sensor of a guiding device.

In the embodiments of the invention, several load sensors may also be arranged on only one or one respective guiding device of a regulating flap. In the latter instance, the additional load sensors can be used for determining load path interruptions in a component-specific fashion or for monitoring load sensors by means of redundant measurements.

According to another embodiment of the inventive actuation system, the monitoring device comprises a function that is realized in such a way that it assigns a fault mode to a regulating flap during the movement of the regulating flap into a predefined position if the sensor value acquired by the load sensor falls short of a first limiting value that corresponds to a minimum operational load or exceeds a second limiting value that corresponds to a maximum operational load. In order to carry out the fault detection, the control and monitoring device may be realized in such a way that it activates the fault detecting function during a flight and, in particular, during each flight.

In the inventive actuation system, a position sensor that serves for determining the adjusted position of the regulating flap and is functionally connected to the control and/or monitoring device furthermore may be respectively arranged on both guiding devices, wherein the control and monitoring device is realized in such a way that it compares the values acquired by the position sensors with one another and assigns a fault mode to a regulating flap during the movement of the regulating flap into a predefined position if the comparison shows that the difference between the values of the position sensors exceeds a minimum difference and if the sensor value acquired by the load sensor falls short of a first limiting value that corresponds to a minimum operational load or exceeds a second limiting value that corresponds to a maximum operational load.

In order to carry out the fault detection, the control and monitoring device may be realized in such a way that it activates the fault detecting function during a flight and, in particular, during each flight.

In this case, the first limiting value corresponding to a minimum operational load and the limiting value corresponding to a maximum operational load may be respectively specified in such a way that the first limiting value amounts to less than half of the second limiting value for the maximum operational load or that the second limiting value is 100 to 150% greater than the first limiting value or that the first limiting value amounts to one-third to one-fifth of the second limiting value.

In this case, the adjusted position of the guiding device determined by the position sensor may be the adjusted position of the actuator of the guiding device. In addition, the adjusted position of the guiding device determined by the position sensor may be the adjusted position of a transmission component of the actuation kinematics of the guiding device.

The load sensor may be arranged on the input side or the output side of the actuator of the guiding device in order to acquire the load occurring on the output side of the actuator due to the actuation of the regulating flap.

According to the invention, it is proposed that, in an adjusted state of the regulating flap or a flight attitude of the aircraft, in which relatively high aerodynamic forces act upon the regulating flap, the measurement of loads by means of the load sensor is carried out on the guiding devices of the same regulating flap, and that the measured loads are checked as to the fact if they fall short of a predefined minimum load or a minimum load to be determined, wherein this minimum load is so small that it does not occur when the load path is interrupted. The measurement may be carried out, in particular, after the regulating flap has been moved into a position specified for a flight phase ("approach" of the aircraft), in which relatively high or the highest aerodynamic forces are applied to the regulating flap in this position thereof. This is the reason why a first limiting value that corresponds to the minimum operational load is used as limiting value for determining whether said limiting value is reached and a fault mode is assigned to the regulating flap if this limiting value is not reached.

Due to this measure, it is possible to realize the identification of the aforementioned fault in the actuation system and, in particular, a load path interruption with a load sensor that has a relatively low measuring accuracy and can be realized with today's technology because it was determined that the loads occurring in this fault scenario and therefore also a limiting value to be specified lie relatively far below the forces expected to actually occur in practical applications.

This is particularly advantageous because the measurement of the load values by means of the load sensor may be relatively inaccurate due to manufacturing tolerances in the actuation kinematics and temperature effects.

Due to the utilization of the inventive load measurement for detecting an underload and/or an overload, particularly for detecting a load path interruption on a guiding device of the same regulating flap, on which the respectively measuring load sensor is not arranged, mechanical load limiting sensors for detecting faults in the actuation system can be eliminated and the component weight can be reduced accordingly. In addition, the detection of an underload and an overload by means of load sensors is more accurate than that of load limiting devices because mechanical load limiting devices have a significant manufacturing tolerance. Due to the higher accuracy in determining an underload or an overload, structural components can be designed for a lower load. The structural weight can also be reduced due to this effect.

This load measurement can be used for detecting other faults such that various faults can be detected with a monitoring mechanism. Consequently, the overall expenditure for the sensors required for detecting various faults is reduced and the system reliability is improved.

According to the invention, the second fault scenario that can be advantageously detected with the inventive actuation system, namely an interruption of the load path in one of the guiding devices of a regulating flap in combination with a blockage in the actuator of the same guiding device, is either based on a first limiting value not being reached or a second limiting value being exceeded. In this fault scenario, it must be expected that the extended position of the regulating flap on the thusly defective guiding device is largely fixed. The occurrence of a first limiting value not being reached or a second limiting value being exceeded in this fault scenario depends on
- whether the fault scenario occurs on a guiding device that is provided with the load sensor for determining that a limiting value is not reached or exceeded, and on
- whether the fault scenario occurs when the regulating flap is or was retracted or extended into the predefined position or the position, in which the fault occurred.

If the fault scenario of an interruption of the load path in one of the guiding devices of a regulating flap in combination with a blockage in the actuator of the same guiding device occurs, for example, on a first of two guiding devices, this fault scenario can under certain circumstances be detected as described below:
- the load sensor, the value of which is used for the fault detection, is situated on the second guiding device and the load measurement by means of this load sensor is carried out during a state of retraction of the guiding devices, e.g., while the regulating flap is retracted; subsequently, the load value acquired by the load sensor is used for determining that a correspondingly predefined first limiting value has not been reached;
- the load sensor, the value of which is used for the fault detection, is situated on the first guiding device and the load measurement by means of this load sensor is carried out during a state of retraction of the guiding devices, e.g., while the regulating flap is retracted; subsequently, the load value acquired by the load sensor is used for determining an excessive load, i.e., that a correspondingly predefined second limiting value has been exceeded;

the load sensor, the value of which is used for the fault detection, is situated on the second guiding device and the load measurement by means of this load sensor is carried out during a state of extension of the guiding devices, e.g., while the regulating flap is extended; subsequently, the load value acquired by the load sensor is used for determining an excessive load, i.e., that a correspondingly predefined second limiting value has been exceeded;

the load sensor, the value of which is used for the fault detection, is situated on the first guiding device and the load measurement by means of this load sensor is carried out during a state of extension of the guiding devices, e.g., while the regulating flap is extended; subsequently, the load value acquired by the load sensor is used for determining that a correspondingly predefined first limiting value has not been reached.

According to an embodiment of the invention, the control and monitoring device is realized in such a way that this control and monitoring device determines that a respective limiting value or threshold value of an operational load is not reached based on the sensor signals received from the load sensor in order to detect a fault on the flap. In this case, the control and monitoring device is realized in such a way that this control and monitoring device determines that a first limiting value of an operational load is not reached and, in another embodiment, also that a second limiting value of an operational load is exceeded based on the sensor signals received from the load sensor. The functions of the control and monitoring device provided in accordance with the invention may be implemented in a physical or hardware module or in several modules that may also be locally dislocated.

The control and monitoring device may be realized in such a way that it also specifies the limiting value or threshold value in dependence on the flap position and/or the flight attitude and/or the operating mode of the aircraft and/or the aircraft configuration (e.g., landing gear extended or retracted).

According to an exemplary embodiment of the inventive actuation system, the limiting value of an operational load is permanently specified in the control and monitoring device.

Alternatively, the control and monitoring device may feature a limiting value determining function, by means of which the first and second limiting value of an operational load are specified by the control and monitoring device during the operation of the aircraft based on operating parameters thereof. In this case, the first and the second limiting value of an operational load may be specified, in particular, based on an assignment of limiting values specified in dependence on the adjusted position of the respectively assigned regulating flap and on the respective adjusted position of the respectively assigned regulating flap. According to the invention, the control and monitoring device may determine that a predefined flight attitude exists by comparing specified flight attitude data with acquired flight attitude data. In this case, the control and monitoring device may, in particular, determine that a predefined flight attitude exists as a result of the comparison if the aircraft speed lies within a predefined speed range and the aircraft altitude lies within a predefined altitude range.

The limiting value that corresponds to a minimum operational load may also have a value of less than 70% of the permissible maximum load at the location of the load sensor. In this case, the first limiting value that corresponds to a minimum operational load may, in particular, amount to less than 60% of the measured value of the load sensor for the second limiting value that corresponds to a permissible maximum operational load. The limiting value that corresponds to a minimum operational load may, in particular, have a value between x1% and x2% of an average cruising load at the location of the load sensor that is determined during the same flight.

The first and the second limiting value of an operational load may additionally or alternatively consist of a limiting value that is determined from state variables of the aircraft. In this exemplary embodiment, the comparison of the respective load value measured by means of a load sensor with a first or second limiting value is carried out when the aircraft is in a predefined flight attitude range that may be specified, in particular, in the form of a speed range and/or altitude range and/or angle of attack range.

In the embodiment, in which the limiting value comparison is carried out in a state of extension of the flap or when the flap is extended, the sensor value that is acquired by the load sensor due to a load and needs to be compared with the limiting value of an operational load may, according to the invention, be a value that is determined in an extended state of the respectively assigned regulating flap. In an inventive embodiment, the first or the second limiting value may be determined by means of the load sensors beforehand in a predefined flight attitude and, in particular, while cruising.

The bearing device of the at least one regulating flap may comprise a dropped-hinge kinematics or Fowler kinematics.

The actuation system according to the invention may be realized with a "central drive," wherein the fault-tolerant actuation system comprises a driving unit that is controlled by the control and monitoring device and mechanically coupled to the adjusting devices of each wing by means of a rotary shaft in order to realize their actuation.

In this case, the driving device may feature at least one driving motor and at least one braking device that is assigned to the driving motor in order to stop the output of the respective driving motor, wherein the control and monitoring unit comprises:

an actuating function for generating command signals for the driving motors in order to adjust the regulating flap, a monitoring function, by means of which a command signal is sent to the braking device in order to activate the braking device when the control and monitoring device assigns a fault mode to one of the respective adjusting devices assigned to the regulating flap based on the comparison of a sensor value of the load sensor with a nominal value.

The actuation system according to the invention may be alternatively realized with a "decentral drive," wherein at least two adjusting devices are respectively connected to the at least one flap of each airfoil and spaced apart from one another in the wingspan direction of the flap, wherein the adjusting devices are respectively coupled to the driving device assigned to the regulating flap by means of a driving connection, and the fault-tolerant actuation system comprises driving devices in order to drive the adjusting devices, wherein one respective driving device is assigned to each regulating flap and the driving devices are functionally connected to a control and monitoring device that activates these driving devices. Each adjusting device may, in particular, respectively feature: two driving motors and two braking devices, wherein at least one braking device is assigned to the driving motors in order to stop the output of the respective driving motor.

The guiding devices may generally consist of a bearing device and an adjusting device and the adjusting device may feature: the actuator, the transmission mechanism for transmitting the power of the respectively assigned driving device and an actuation mechanism for kinematically coupling the actuator to the regulating flap.

In this case, the adjusting devices of a regulating flap may furthermore feature: at least one driving motor and at least one braking device that is assigned to the driving motor in order to stop the output of the respective driving motor, wherein the control and monitoring device may feature control and monitoring units, one of which respectively is functionally connected to the at least two respective adjusting devices connected to a regulating flap, and wherein each control and monitoring unit comprises:

an actuating function for generating command signals for the driving motors in order to adjust the regulating flap,
a monitoring function, by means of which a command signal is sent to the braking device in order to activate the braking device when the control and monitoring device assigns a fault mode to one of the respective adjusting devices assigned to the regulating flap based on the comparison of a sensor value of the load sensor with a nominal value.

According to the invention, a method for reconfiguring an actuation system with adjustable regulating flaps is also proposed, wherein said method comprises the following steps:

carrying out a comparison between a load value that corresponds to a sensor value acquired by the load sensor assigned to a regulating flap and a first limiting value that corresponds to a minimum operational load during a/each flight when the regulating flap is moved into a predefined position or when a control command for moving the regulating flap is generated or when it is determined that a predefined flight attitude exists, and assigning a fault mode to the regulating flap if this limiting value is not reached. In this case, the following comprises, in particular, may furthermore be provided:

BRIEF DESCRIPTION OF THE DRAWINGS

The invention is described below with reference to the attached figures, in which.

DETAILED DESCRIPTION

Figure 1:
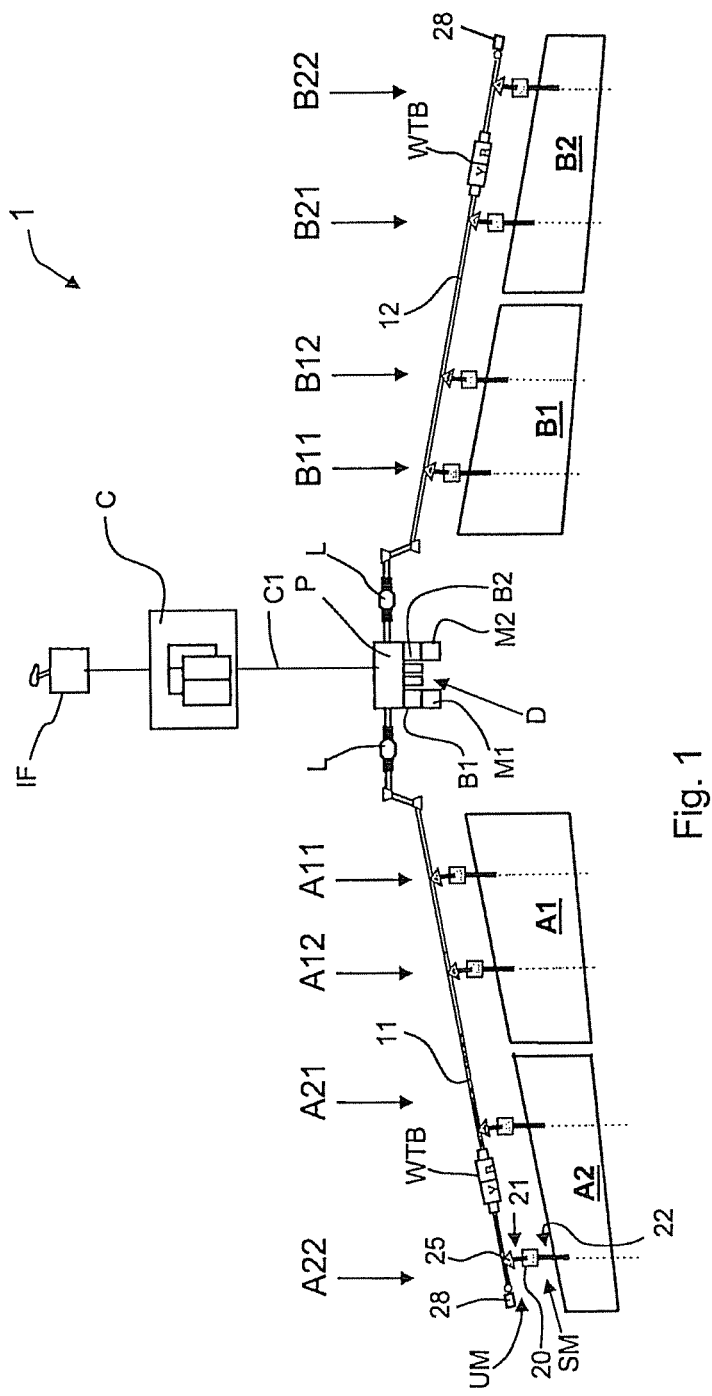
FIG. 1 shows a schematic representation of an embodiment of the inventive high-lift system with regulating flaps, two of which are provided for each wing, and with adjusting devices for actuating the regulating flaps, wherein the adjusting devices respectively feature at least one actuator and at least one first load sensor on the input side and one second load sensor on the output side of the at least one actuator, and wherein the adjusting devices are driven by a central driving motor and a rotary shaft coupled thereto.

FIG. 1 shows an embodiment of the inventive actuation system in the form of a high-lift system 1 for adjusting at least one regulating flap A1, A2, B1, B2 and, in particular, at least one landing flap on each airfoil. According to FIG. 1, two landing flaps are provided on each airfoil that is not illustrated in FIG. 1. This figure specifically shows: an inner landing flap A1 and an outer landing flap A2 on a first airfoil and an inner landing flap B1 and an outer landing flap B2 on a second airfoil. In the inventive high-lift system, it would also be possible to provide one or more than two landing flaps per airfoil. In order to adjust the regulating flap A1, A2, B1, B2, it is coupled to at least two guiding devices A11, A12, B11, B12, A21, A22, B21, B22 that are coupled to each regulating flap A1, A2, B1, B2 and spaced apart from one another in the wingspan direction of the regulating flap A1, A2, B1, B2.

The guiding devices A11, A12, B11, B12, A21, A22, B21, B22 fulfill a bearing function, by means of which the regulating flaps are movably supported on the main wing H, as well as an actuating function, by means of which the position of the regulating flaps can be adjusted relative to the main wing H. The actuating function may be realized, in particular, by means of an actuation mechanism SM (FIG. 3) and the bearing function may be realized by means of a bearing station LS.

In the embodiment of a guiding device illustrated in FIG. 3, the regulating flaps A1, A2, B1, B2 or K are movably supported on the main wing H of the airfoil by means of respective bearing devices or bearing stations LS. In addition, each regulating flap A1, A2, B1, B2 or K is coupled to an adjusting station with at least one actuation mechanism SM, wherein the actuation mechanism SM is realized in such a way that it can convert the power transmitted thereto by the driving device P or PA1, PA2, PB!, PB2 into an adjusting movement of the regulating flap supported on the bearing station.

The at least one bearing device LS assigned to a flap may generally feature "Dropped-Hinge kinematics" or "Fowler kinematics." The "Fowler kinematics" may be realized, e.g., in the form of "Track kinematics," "Track-Link kinematics" or "Linkage kinematics." "Track kinematics" comprises a combination of a rail and a carriage that can be moved on the rail and form an integrated unit for adjusting and supporting the respective regulating flap. In order to adjust the regulating flap, an adjusting device is coupled to the carriage such that the adjusting device accordingly moves the carriage along the rail ("Track") due to the actuation by the respectively assigned driving device and consequently moves the flap. In this case, the adjusting device may consist of a rotary actuator or a spindle drive that is coupled to the carriage in order to realize the movement thereof. In so-called "Dropped-Hinge kinematics," the bearing device comprises a joint brace that is arranged on the main wing in the region of its trailing edge and protrudes downward from this location. The flap is coupled to the outer end of the joint brace by means of a mounting arranged on the main wing. In this case, the adjusting device may be coupled, in particular, to the flap and consist of a rotary actuator.

The high-lift system 1 is actuated and controlled via an interface that comprises, in particular, a pilot interface IF in the form of an actuating element such as, e.g., an actuating lever. The actuating element IF is functionally coupled to a control and monitoring device 5 that transmits control commands for activating a driving device P via an activation line C1. In the embodiment according to FIG. 1, the control and monitoring device 5 is realized in the form of a so-called "central" control and monitoring device 5, i.e., it comprises control and monitoring functions for several and, in particular, all adjusting devices A11, A12, B11, B12, A21, A22, B21, B22 of the high-lift system 1.

The central driving device P is arranged, e.g., in the fuselage area and may consist of one or more driving motors. In the embodiment of the high-lift system 1 shown, the driving device P comprises two driving motors M1, M2 that may be realized, e.g., in the form of a hydraulic motor and an electric drive. In addition, the driving device P may feature at least one braking device that is assigned to the driving motors M1, M2 and can be respectively actuated with a command signal of the control and monitoring device 5. In the embodiment of the high-lift system illustrated in FIG. 1, the driving device P comprises two braking devices B1, B2 that can be respectively actuated with a command signal of the control and monitoring device 5. The at least one braking device B1, B2 is functionally connected to the control and monitoring device 5 that, under certain circumstances, can actuate the braking device and thusly block the rotary shaft drive trains 11, 12. If a defect occurs in the driving motor or one of several driving motors, the corresponding driving motor can be switched off by the central driving device P or a driving motor control assigned to the at least one driving motor. If the driving device P comprises only one motor, the driving device may also be realized with only one braking device. Such a motor may, in particular, also be realized in the form of a redundant motor, the driving function of which is designed redundantly in order to improve the failure safety.

In the embodiment with two motors M1, M2 according to FIG. 1, the driving device P may feature a differential D that is coupled to the output sides of the hydraulic motor M1 and the electric motor M2 in such a way that the power made available by the hydraulic motor M1 and the power made available by the electric motor M2 are added up and transmitted to rotary shaft drive trains that are realized, in particular, in the form of rotary drive shafts 11, 12. In the exemplary embodiment of the inventive high-lift system illustrated in FIG. 1, two braking devices B1, B2 are furthermore provided and functionally connected to the control and monitoring device 5. The control and monitoring device 5 is realized in such a way it can actuate the braking devices B1, B2 and therefore lock the rotary drive shafts 11, 12 under predefined circumstances, particularly when a critical fault is assigned to one of the components of the actuation system. If one of the two driving motors is switched off, e.g., the hydraulic motor M1 or the electric drive M2 in the embodiment shown, the power delivered by the central driving device P is reduced by the amount of the switched-off driving motor due to the differential that is realized in such a way that the power made available by the hydraulic motor M1 and the power made available by the electric motor M2 are added up. It would also be possible to provide only one braking device instead of two braking devices B1, B2 and only one motor instead of two motors M1, M2.

In the exemplary embodiment of the actuation system shown, the driving device P serves for driving or actuating all regulating flaps A1, A2, B1, B2 of the actuation system, i.e., at least one regulating flap per airfoil, preferably several regulating flaps A1, A2 and B1, B2 per airfoil, by means of corresponding adjusting devices. Such a driving device may be arranged at a central location, i.e., particularly in the fuselage of the aircraft. All in all, two drive trains, particularly in the form of the rotary drive shafts 11, 12, are respectively coupled to the driving device P in order to actuate the at least one flap A1, A2 and B1, B2 per airfoil. The two rotary drive shafts 11, 12 are coupled to the central driving device P and synchronized by this central driving device. The central driving device P sets the rotary drive shafts 11, 12 in rotation due to corresponding control commands in order to realize adjusting movements of the coupled adjusting devices A11, A12, B11, B12, A21, A22, B21, B22 of the respective regulating flap A1, A2 and B1, B2. A load limiting device or torque limiting device L may be integrated into a shaft section of the rotary drive shaft 11, 12 that lies near the driving device P.

At least one guiding device A11, A12, B11, B12, A21, A22, B21, B22 is coupled to each flap A1, A2 and B1, B2 in order to realize the adjustment thereof. In the high-lift system 1 illustrated in FIG. 1, two adjusting devices A11, A12 or B11, B12 or A21, A22 or B21, B22 are respectively arranged on each regulating flap A1, A2, B1, B2, wherein the guiding devices A11, A12 and B11, B12 are respectively arranged, in particular, in the inner regulating flaps A1 and B1 and the guiding devices A21, A22 and B21, B22 are respectively arranged on the outer flaps A2 and B2. All guiding devices, i.e., generally at least one guiding device, that respectively actuate or actuates one flap, may also be referred to as an adjusting station.

Figure 2:
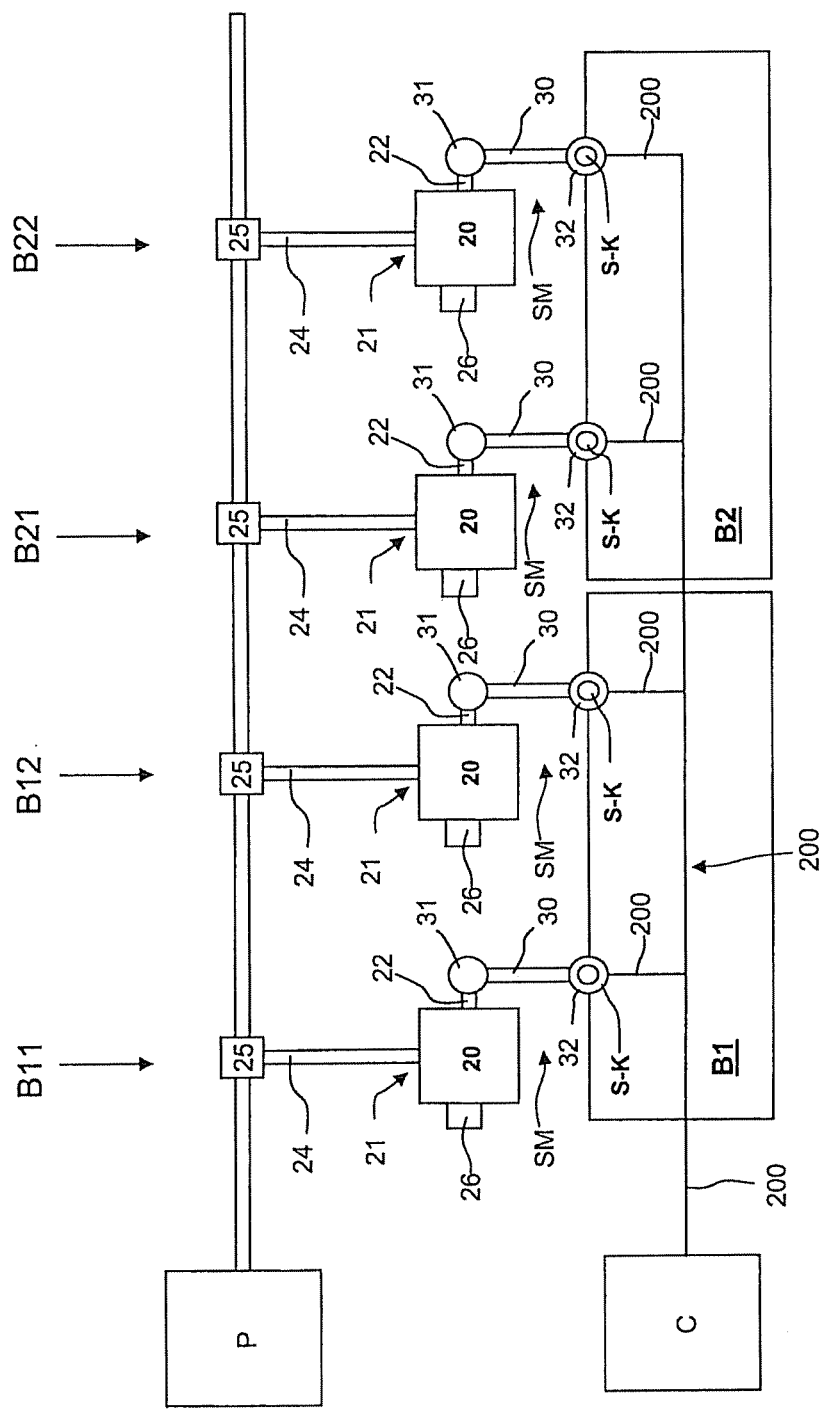
FIG. 2 shows an enlarged representation of the part of the high-lift system according to FIG. 1 that is intended for the right wing referred to the longitudinal aircraft axis.

The guiding devices B11, B12, B21, B22 are described below with reference to FIG. 2 and the regulating flaps B1, B2, wherein components of different guiding devices B11, B12, B21, B22 that fulfill the same function are respectively identified by the same reference symbol in each guiding device B11, B12, B21, B22. This figure shows an embodiment of the actuation system and, in particular, the high-lift system 1, in which a load sensor S-D is provided on the drive rod 30 of each guiding device B11, B12, B21, B22 or integrated therein.

Each of the guiding devices B11, B12, B21, B22 (or each of the guiding devices A11, A12, B11, B12, A21, A22, B21, B22 in the illustration according to FIG. 1) comprises a transmission mechanism UM for transmitting the power of the respectively assigned driving device P or PA1, PA2, PB1, PB2, an actuator 20 or a transmission gearing 20 coupled thereto and an actuation mechanism SM that is coupled to the actuator 20 and serves for kinematically coupling the actuator 20 to the regulating flap K or A1, A2; B1, B2.

The actuator 20 generally is coupled to the output of the driving device directly or via the transmission mechanism UM. This can be realized with the aid of the transmission gearing 25. In the embodiment illustrated in FIG. 1, such a transmission gearing 25 is provided for converting the movement of the respective drive shafts 11, 12 into a movement of a driving component or driving element 21 that is coupled to the actuator 20 in order to transmit an input movement to an input element 21 or a so-called "Downdrive-Link" on the input side of the actuator 20. The actuator or the transmission gearing 20 is mechanically coupled to the respective rotary drive shafts 11, 12 and converts a rotary movement of the respective rotary drive shafts 11, 12 into an adjusting movement of the flap region coupled to the respective guiding devices B11, B12, B21, B22.

In this case, a position sensor 26 may be arranged on each adjusting device B11, B12, B21, B22 of a flap (FIG. 2), wherein this position sensor determines the current position of the respective regulating flap A1, A2, B1, B2 and transmits this position value to the control and monitoring device 5 via a not-shown line.

The actuator 20 generally is coupled to the regulating flap A1, A2, B1, B2 by means of an actuation mechanism SM for kinematically coupling the actuator 20.

Furthermore, the actuator 20 generally comprises an output element or driving element 22 that is coupled to a coupling device 30 on the flap side in order to couple the actuator 20 to the respective regulating flap. Consequently, a movement of the output element 22 results in a movement of the respective regulating flap A1, A2, B1, B2. A mechanical transmission mechanism with a transmitting function may be provided between the input element 21 and the output element 22 in this case.

In addition, an asymmetry sensor 28 may be arranged on the ends of the rotary drive shafts 11 and 12, wherein this asymmetry sensor is also functionally connected to the control and monitoring device 5 via a not-shown line and transmits a current value to the control and monitoring device 5 via this line, and wherein this current value indicates whether the ends of the rotary drive shafts 11 and 12 rotate within a predefined range or the rotary drive shafts 11 and 12 are in an asymmetric rotational position.

Furthermore, a wing tip brake WTB may be respectively arranged on each rotary drive shaft 11 and 12 and, when actuated, block the rotary drive shaft or the respective drive train 11 or 12. In this case, the wing tip brake WTB is arranged, in particular, at a location of the rotary drive shafts 11 and 12 that lies in an outer region of the respective wing. Each of the wing tip brakes WTB is functionally connected to the control and monitoring device 5 via a not-shown line and can be activated and actuated by the control and monitoring device 5 via this line. During the normal operation, the initial state of the wing tip brake WTB is a non-actuated state, in which it does not intervene with the rotation of the rotary drive shafts 11 and 12. The wing tip brakes WTB can be actuated with a corresponding control signal from the control and monitoring device 5 in order to lock the respectively assigned rotary drive shaft 11 or 12.

Figure 3A:
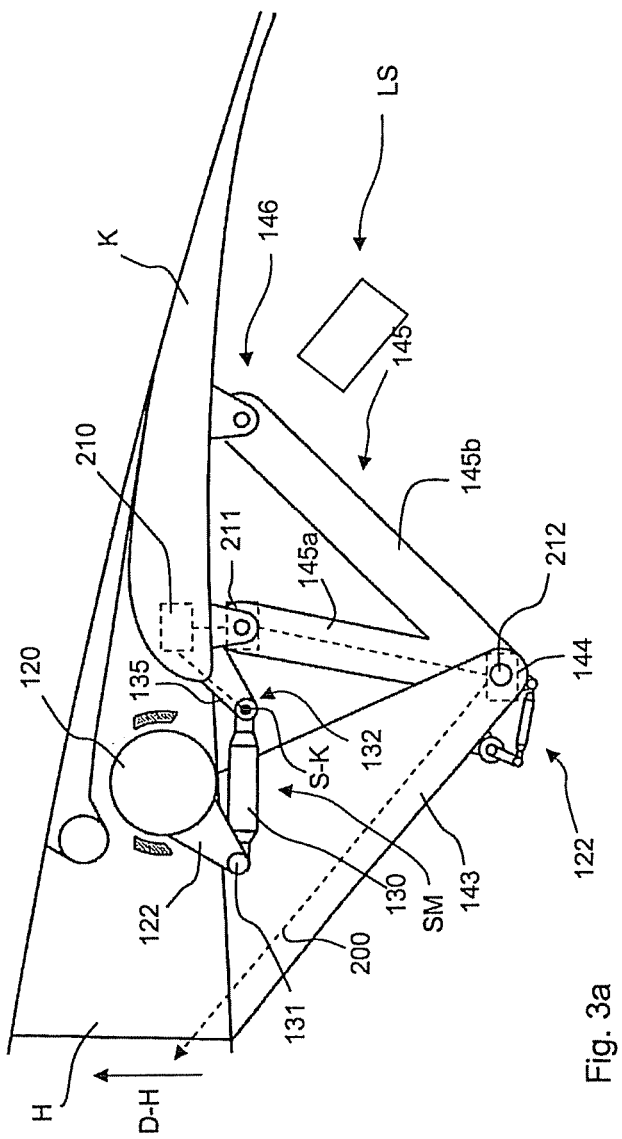
FIG. 3a shows a schematic representation of an embodiment of the adjusting device according to the invention, as well as an illustration of the arrangement of the load sensor in the rotary joint that couples the connecting rod to the regulating flap.

In an exemplary embodiment of a guiding device that is illustrated in FIG. 3a, the actuator is realized in the form of a rotary actuator 120 and the output element is realized in the form of an actuator lever 122 and the drive rod 130 or connecting lever that couples or couple the actuator to the regulating flap K by means of joints 131, 132.

In this case, a first joint 131 couples the drive rod 130 to the actuator lever 122 and a second joint 132 couples the drive rod 130 to the regulating flap K.

Figure 3B:
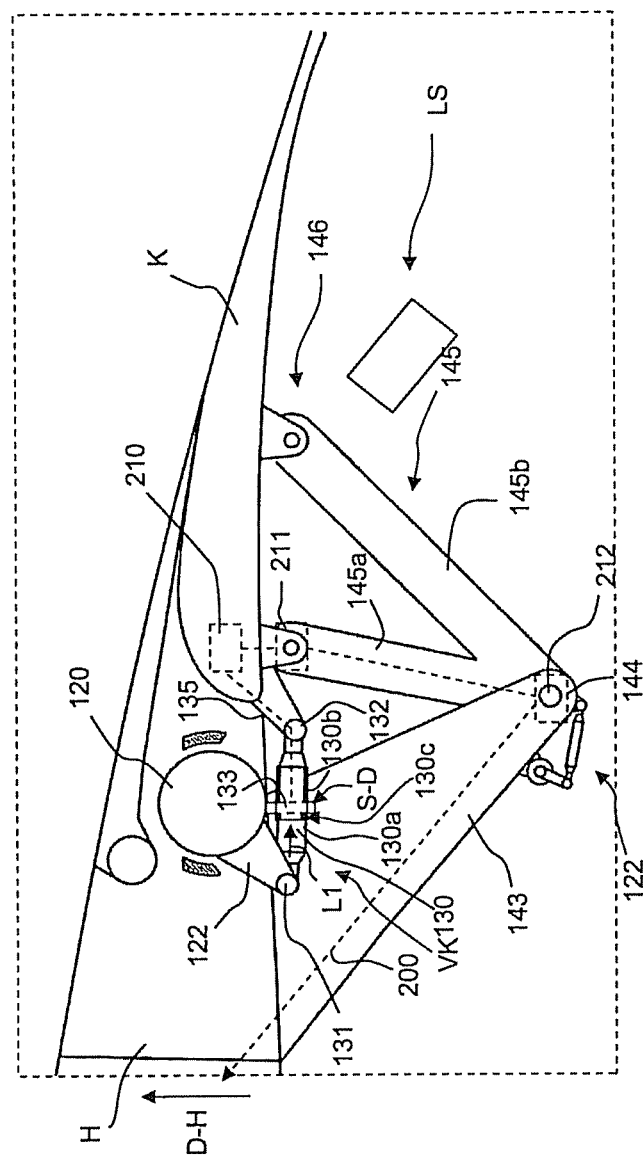
FIG. 3b shows a schematic representation of a second embodiment of the adjusting device according to the invention, as well as an illustration of the arrangement of the load sensor in the rotary joint that couples the connecting rod to the regulating flap.
Figure 3C:
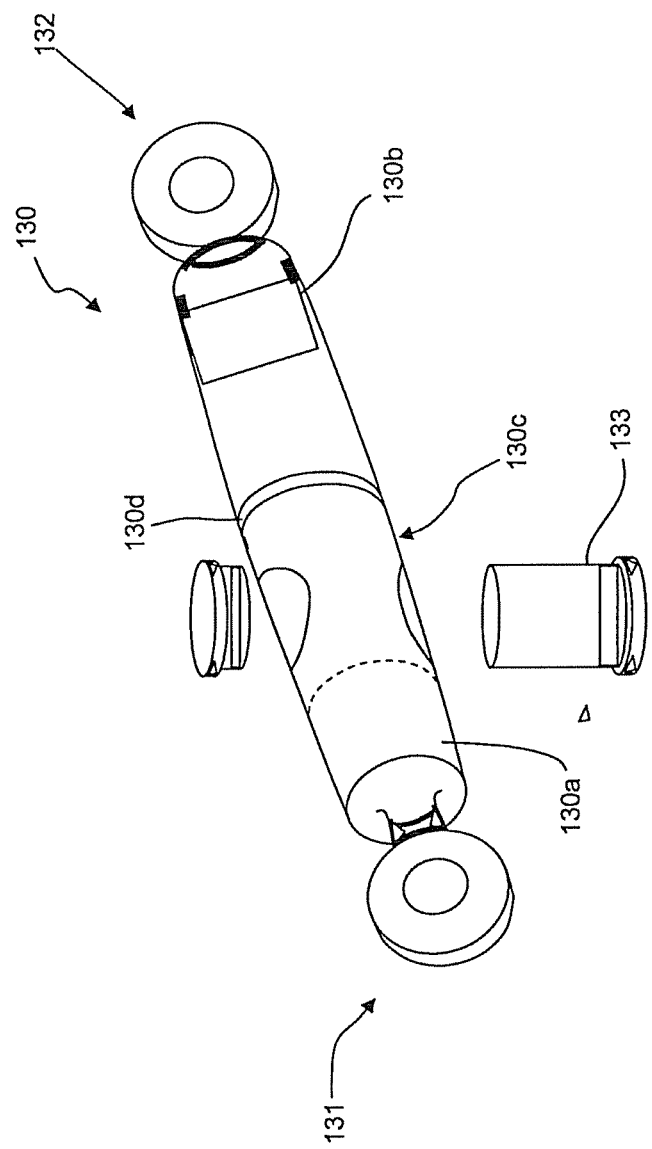
FIG. 3c shows a schematic, perspective exploded view of an embodiment of the drive rod with a cross bolt that comprises a load sensor according to FIG. 3b.

According to another inventive embodiment that is illustrated in FIGS. 3b and 3c, the load sensor for determining the load occurring in the load path between the actuator and the regulating flap of the respective guiding device is integrated into the drive rod 130 and functionally connected to the control and monitoring device 5 such that it can receive the sensor signals generated by the load sensor. In this case, the load sensor is realized in the form of a sensor for measuring the longitudinal force occurring in a drive rod 130 along its longitudinal direction L1. According to an embodiment of the invention, the drive rod is composed of a first drive rod section 130a that is coupled to the actuator lever 122, a second drive rod section 130b that is coupled to the regulating flap K and a cross bolt 133 (FIG. 3c) that couples these drive rod sections to one another. In this case, the drive rod sections 130a, 130b are arranged such that they partially overlap one another and an overlapping region 130c is formed. A seal 130d may be arranged between the drive rod sections 130a, 130b in the overlapping region in order to prevent the admission of dirt and/or moisture into the area between the drive rod sections 130a, 130b. The cross bolt extends through the drive rod sections 130a, 130b transverse to the longitudinal direction L1 of the drive rod 130 in their overlapping region 130c in order to couple the drive rod sections 130a, 130b to one another in a force-transmitting fashion. According to the invention, the load sensor S-D comprises a sensor that is arranged in or on the cross bolt 133 and serves for acquiring lateral forces that act upon the bolt as a result of longitudinal forces occurring in the drive rod 130.

According to the invention, the load sensor may consist of at least one strain gauge. In this case, the at least one strain gauge may be arranged on the cross bolt 133. The cross bolt may be realized, in particular, in the form of a hollow bolt. The at least one strain gauge may be arranged, in particular, on the inner surface of the cross bolt in this case. The load sensor may also consist of several strain gauges in a full bridge arrangement. The load sensor may furthermore be realized in the form of a temperature-compensated sensor arrangement.

According to an alternative embodiment of the invention, the drive rod is composed of a first drive rod section 130a that is coupled to the actuator lever 122, a second drive rod section 130b that is coupled to the regulating flap K and a coupling device that couples these drive rod sections to one another and comprises a load sensor for determining longitudinal forces occurring in the drive rod 130. In this case, the coupling device may feature, in particular, a pretensioning device and/or damping device, into which the load sensor for determining longitudinal forces is integrated.

The regulating flap is coupled to the main wing H by means of at least one bearing device LS, wherein the bearing device 141 in the exemplary embodiment according to FIG. 3 is realized with Dropped-Hinge kinematics. The bearing device 141 comprises a mounting brace 143 that is arranged on the main wing H, wherein said mounting brace extends downward from the main wing referred to the wing thickness direction D-H and contains a bearing joint 144. A supporting device in the form of a joint brace 145 is coupled to the bearing joint 144 and mounted or supported on a regulating flap K by means of a mounting device 146. The actuator is realized in the form of a rotary actuator 120.

In an alternative embodiment of the guiding device with Track kinematics (not illustrated in the figures), an actuator that may consist, e.g., of a rotary actuator or a spindle drive is coupled to a carriage, wherein a drive rod (analogous to the drive rod 130) is arranged on the carriage by means of a first joint and on the regulating flap by means of a second joint.

According to the invention, at least one guiding device (in FIG. 1 the guiding devices A11, A12, B11, B12, A21, A22, B21, B22) that is arranged on an airfoil and serves for coupling a regulating flap A1, A2, B1, B2 to a main wing H comprises a load sensor S-D that is arranged in the drive rod 130 or the joint 32 or 132, by means of which the drive rod 30 or 130 is coupled to the regulating flap K or A1, A2, B1, B2, wherein the load sensor S-D is realized in such a way that it acquires the forces occurring in this load path. The load sensor S-D is functionally connected to the control and monitoring device 5 such that it can receive the sensor signals generated by the load sensors. The load sensor S-D is provided for measuring loads that are transmitted from the flap K to the actuation mechanism SM as a result of external forces acting upon the flap K.

As an alternative or in addition to the arrangement of at least one load sensor in the actuation mechanism SM, a load sensor may also be arranged in the transmission mechanism UM. In this case, it may be arranged, in particular, in the transmission gearing 25 and/or drive component or drive element 21.

The load sensor according to the invention measures an operational load occurring in the respective guiding device A11, A12, B11, B12, A21, A22, B21, B22, wherein the measured operational load is monitored with respect to the fact whether it falls short of the first limiting value and, in other applications, exceeds a second limiting value by means of the control and monitoring device 5. The measurement of the operational load may be carried out independently of the adjusted position of the regulating flap A1, A2, B1, B2 or K, i.e., within the entire range of adjustment of the regulating flap A1, A2, B1, B2 or K. The measurement of the operational load may be carried out continuously or in specified time intervals because the operational load is defined independently of an adjusted position of the regulating flap A1, A2, B1, B2 or K. The specification of a limiting value for the operational load makes it possible to detect, e.g., a fracture or "disconnect" of one of the guiding devices because the loads occurring on at least one additional guiding device of the same regulating flap A1, A2, B1, B2 or K in this case can be significantly higher than the operational loads occurring when all guiding devices are intact. A measurement of the respective load occurring at the load sensor that is carried out continuously or in certain time intervals or in certain system states, particularly when the regulating flap is in a defined position, enables the control and monitoring device 5 receiving the respectively acquired sensor signals to compare these sensor signals with a predefined first limiting value that corresponds to a minimum load and optionally to a second limiting value that corresponds to a maximum load, as well as to assign a fault mode to the corresponding guiding device of the regulating flap or at least the regulating flap altogether if the respective limiting value is not reached or exceeded and to initiate, if applicable, suitable measures for reconfiguring the actuation system or the adjusting station. These measurements and associated comparisons of the measured values with the operational load therefore may be carried out in any adjusted position of the regulating flap A1, A2, B1, B2 or K.

If a load path interruption occurs in a first guiding device of a regulating flap, e.g., greater loads than in instances, in which such a fault mode does not exist, occur on the other guiding device of the same flap, i.e., a second limiting value is exceeded, if the control and monitoring device 5 previously and/or subsequently issued an adjusting command for retracting the regulating flap K. In this case, significantly higher forces occur in a second joint 32 or 132 of the still intact guiding device of the same regulating flap A1, A2, B1, B2 or K because not only the aerodynamic loads, but also the forces exerted by the guiding device act upon the second joint 32 or 132 such that the control and monitoring device 5 determines that the predefined maximum load is exceeded based on the signal values that are acquired by the load sensor S-D arranged in the same joint for the respectively occurring load and based on a corresponding comparison. The control and monitoring device 5 may be realized in such a way that it assigns a fault mode to the respective adjusting station that belongs to the concerned regulating flap A1, A2, B1, B2 or K and comprises the guiding devices A11, A12 or B11, B12 or A21, A22 or B21, B22 that are respectively assigned to the regulating flap A1, A2, B1, B2 or K, wherein the control and monitoring device may, if applicable, also initiate suitable measures for reconfiguring the actuation system or the adjusting station.

If a load sensor S-D signals a no-load state while the other load sensor S-D connected to the other driving station of the same regulating flap A1, A2, B1, B2 or K signals an increased load, it can be assumed that the coupling of the actuator to the regulating flap A1, A2, B1, B2 or K has fractured and this scenario may be defined by a corresponding fault mode. In this case, the control and monitoring device 5 may also be realized in such a way that it generates a command signal for the braking devices in order to immediately stop the actuation system.

If one guiding device of a regulating flap A1, A2, B1, B2 or K is blocked and the drive of another guiding device of the same regulating flap remains functional, the occurring is tilt of the regulating flap A1, A2, B1, B2 or K results in an increased load on the defective adjusting device A11, A12, B11, B12, A21, A22, B21, B22, wherein this increased load is detected based on a corresponding comparison of the values acquired by the load sensor S-D arranged at this location with nominal values and also causes the control and monitoring device 5 to immediately passivate and stop the actuation system by generating a corresponding command signal.

As soon as a load sensor S-D detects a load that, according to the invention, lies below a defined first limiting value and optionally above a defined second limiting value that is greater than the first limiting value, an underload or an overload is respectively identified, wherein the corresponding control and monitoring device 5 may be realized in such a way that the actuation system or the adjusting station is halted, i.e., stopped. The limiting value or threshold value may either be a fixed, predefined value or a value that is dependent on others state variables. If only a fixed value is used, the function of today's load limiting devices can be realized with an underload or overload detection on an electronic basis. However, the use of state-dependent threshold values allows an earlier fault detection in many fault scenarios.

The load sensor S-D may alternatively or additionally measure whether an operational load predefined based on assumptions is not reached and/or exceeded. Since the load sensors S-D are situated at the interface between system and structure, it would, according to the invention, also be possible to determine the structural loads with these sensors. If the load profiles are continuously recorded in the central computer, they can be evaluated with respect to the structural load cycles. This information can be used for "Duty Cycle" monitoring and/or "Health Monitoring."

The control and monitoring device 5 may be realized in such a way that it concludes and identifies a "Disconnect" of the same adjusting device based on a comparison of signal values for the respectively occurring load with values for an assumed operational load showing that the actually determined load falls short of a predefined or determined operational load, namely because the external forces occurring on the flap cannot be transmitted to the adjusting kinematics VK of the same guiding device A11, A12, B11, B12, A21, A22, B21, B22 via the connecting device in this case. The control and monitoring device 5 assigns a fault mode to the respective guiding device A11, A12, B11, B12, A21, A22, B21, B22 or adjusting station and, if applicable, initiates suitable measures for reconfiguring the actuation system or the adjusting station such as, e.g., stopping the actuation system or high-lift system 1 by means of the braking devices B1, B2.

In this case, the nominal value or comparative value used may depend on the adjusted position, wherein the respective comparative values or the predefined operational load for each adjusted position is determined by means of tests and stored in the control and monitoring device 5. Consequently, the measurement can be carried out continuously during the operation of the aircraft, particularly in, e.g., regular time intervals or in dependence on the adjusted state of the guiding devices of a regulating flap A1, A2, B1, B2 or K. The load measurement may also be carried out when commanding and carrying out an adjustment of the guiding device A11, A12, B11, B12, A21, A22, B21, B22 or the regulating flap A1, A2, B1, B2 or K, respectively. If the load measurement is carried out continuously or regularly, the control and monitoring device 5 determines a comparative value during the adjustment of the regulating flap A1, A2, B1, B2 or K that—depending on the type of comparative value, i.e., on whether the value comprises a maximum value or an operational load value—cannot be exceeded or must be reached, wherein a corresponding comparative value is used for the comparison depending on the respectively adjusted position of the regulating flap A1, A2, B1, B2 or K. For example, when the landing flap is extended prior to the landing approach, the control and monitoring device 5 can carry out a measurement of the load by means of the load sensor and determine based on the comparison whether a maximum load is exceeded or an operational load is not reached, as well as assign a fault to the respectively concerned guiding device in such instances. The control and monitoring device 5 may subsequently or simultaneously carry out a reconfiguration of the actuation system, in which the actuation system 1 is locked by means of the at least one braking device and/or a modified landing mode suitable for the landing approach in the respectively determined fault mode is specified.

The control and monitoring device 5 may, in particular, feature a function, by means of which the guiding devices of a regulating flap are moved into a predefined position and an inventive load measurement is subsequently carried out by means of the load sensor arranged on the respective guiding device of the regulating flap in order to determine, if applicable, a fault on the respective regulating flap and, if applicable, to initiate a reconfiguration measure of the actuation system. The measurement may be carried out while the regulating flap is extended or retracted.

In a high-lift system 1, in which the actuators 20 and 120 of the guiding devices A11, A12, B11, B12, A21, A22, B21, B22 are controlled by a decentral control and monitoring device 5 via electric lines and in which at least two actuators 20 and 120 are connected to a regulating flap in order to realize the actuation thereof, the respective regulating flap A11, A12, B11, B12, A21, A22, B21, B22 is no longer actuated after an inoperatability mode (fault scenario A) has been assigned to the respective guiding device A11, A12, B11, B12, A21, A22, B21, B22 by the guiding device fault detecting function. In order to avoid control asymmetries, the regulating flap that is arranged symmetrical to the faulty regulating flap referred to the longitudinal axis of the aircraft also may no longer be actuated. In addition, a brake B1, B2 provided in the actuator 20 or 120 for such instances may be actuated in order to lock the regulating flap A11, A12, B11, B12, A21, A22, B21, B22 in its current position.

If the actuators are driven by a common rotary drive shaft 11, 12 and the respective components of the adjusting kinematics VK are equipped with a failsafe mechanism, the high-lift system reconfiguration function may continue actuating the concerned guiding device A11, A12, B11, B12, A21, A22, B21, B22.

In such a high-lift system, in which actuators of the guiding devices A11, A12, B11, B12, A21, A22, B21, B22 are controlled by a central control and monitoring device 5 via electric lines, the same optional measures as in fault scenario A may be initiated if fault scenario B occurs. In a high-lift system 1 according to FIG. 1, in which the guiding devices A11, A12, B11, B12, A21, A22, B21, B22 are mechanically driven by means of rotary drive shafts 11, 12, the system may be blocked by means of the motor brakes M1, M2 and/or the wing tip brake WTB when fault scenario B is assigned to a guiding device in order to avoid conflicting system-internal forces.

In a high-lift system 1 that is driven centrally, i.e., via rotary shafts 11, 12, the control and monitoring device 5 or the high-lift system reconfiguration function may send an actuation signal to the wing tip brake WTB, as well as to the at least one braking device B1, B2, if the nominal positions determined by the control and monitoring device 5 impermissibly deviate from the actual positions acquired by means of the position sensors 26 in order to lock both shaftings 11, 12.

In the exemplary embodiment illustrated in FIG. 3, the actuator lever 131 of the rotary actuator 120 is coupled to the drive rod 130 by means of a first joint 131 and this driving rod is in turn coupled to a connecting device 135 of the regulating flap K by means of a second joint 131.

A guiding device A11, A12, B11, B12, A21, A22, B21, B22 of the regulating flap A1, A2, B1, B2 or K that is designed in the form of Dropped-Hinge kinematics or in the form of Track kinematics with a rotary actuator 20, 120 may be realized, in particular, in such a way that the second joint 32 or 132 between the drive rod 30 or 130 and the regulating flap A1, A2; B1, B2 or K is adjusted by an angular range that amounts to less than 30% and preferably less than 50% of the angular range, by which the first joint 31 or 131 is adjusted, while the maximum adjustment travel of the flap is carried out. In other words, the angle between the drive rod 30 or 130 and the regulating flap A1, A2, B1, B2 or K changes by an amount that lies below 30% and preferably below 50% of the angular change occurring between the drive rod 30 or 130 and the actuator lever 22 or 122 during a maximum adjustment travel of the flap.

The load sensor S-D is provided for measuring loads that are transmitted from the regulating flap A1, A2, B1, B2 or K to the actuation mechanism SM as a result of external forces acting upon the regulating flap A1, A2, B1, B2 or K. In this case, the load sensor S-D may measure when a maximum load is reached or exceeded. The load sensor S-D may alternatively or additionally measure when an operational load is not reached and/or exceeded. This occurs, in particular, during a "Disconnect" of adjusting kinematics VK.

According to an exemplary embodiment of the actuation system or high-lift system 1, the sensors are directly connected to a "central" control and monitoring device 5 that preferably is centrally arranged in the aircraft fuselage, wherein the signals of the load sensors S-D are transmitted for evaluation purposes to the central control and monitoring device 5, in which the comparing function for comparing the sensor signals acquired by the load sensors S-D with nominal values, as well as the evaluation with an assignment of a fault mode to a guiding device if the compared values deviate accordingly, are implemented (FIG. 1). In addition, the central control and monitoring device 5 may feature a reconfiguration function that generates commands for reconfiguring the actuation system 1 or the flight control of the aircraft. Such a command may consist, e.g., of a command for activating the braking devices B1, B2, WTB of the actuation system and/or or a command for a safety mode or Back-Up mode in the flight control of the aircraft such as, e.g., a landing mode that is modified in comparison with the normal landing mode and in which the regulating flaps A1, A2, B1, B2 or K that are still considered to be intact are moved into a position suitable for the landing in the respectively determined fault mode and/or in a determined adjusted position of the regulating flap A1, A2, B1, B2 or K, to which the adjusting devices A11, A12, B11, B12, A21, A22, B21, B22 of the high-lift system 1 determined to be faulty are coupled.

Figure 4:
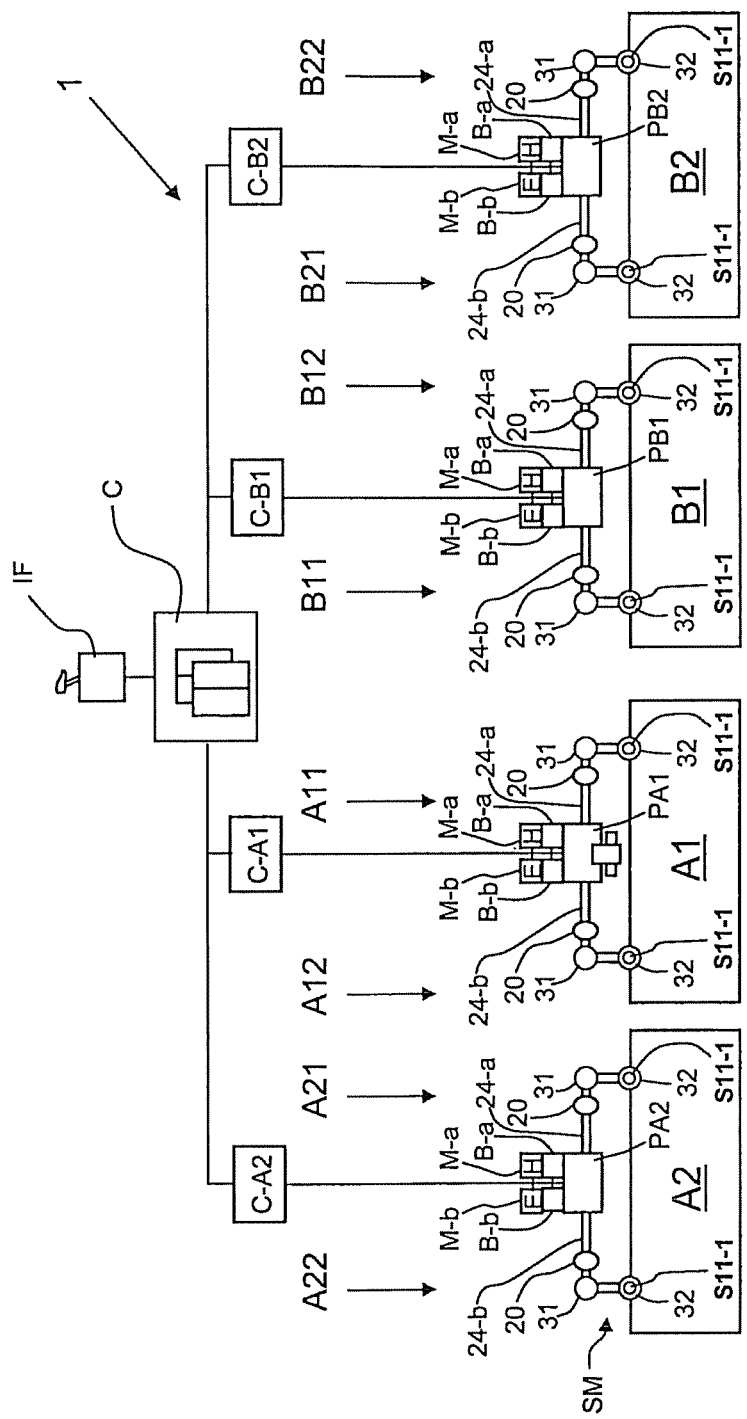
FIG. 4 shows a schematic representation of an embodiment of the inventive high-lift system that represents an alternative to the illustration in FIG. 1 and comprises regulating flaps, the adjusting devices of which are actuated by means of one respective driving device, wherein the same reference symbols are partially assigned to components of the high-lift system according to FIG. 4 that have a function similar to that in FIG. 1.

According to the exemplary embodiment illustrated in FIG. 4, decentral or local control and monitoring devices C-A1, C-A2, C-B1, C-B2 may be provided that are preferably arranged in the main wing, as well as respectively assigned to the guiding devices A11, A12, B11, B12, A21, A22, B21, B22 of the same regulating flap A1, A2, B1, B2 or K referred to the wingspan direction of the main wing and preferably arranged in the spatial vicinity of said guiding devices that are respectively activated by the local control and monitoring device 5. In this case, each local control and monitoring device 5-A1, C-A2, C-B1, C-B2 may feature an inventive fault detecting function and reconfiguration function for the respectively assigned guiding devices A11, A12, B11, B12, A21, A22, B21, B22. In such an embodiment, a central control and monitoring device 5 is also provided in order to determine and command nominal adjusted positions for each of the local control and monitoring devices C-A1, C-A2, C-B1, C-B2. The central control and monitoring device 5 receives the assignment of a fault mode to a guiding device or the guiding devices A11, A12, B11, B12, A21, A22, B21, B22 of a regulating flap A1, A2, B1, B2 or K from the local control and monitoring devices 5-A1, C-A2, C-B1, C-B2 if a fault was respectively detected thereon or sensor value deviations were identified.

In the embodiment according to FIG. 4, each regulating flap A1, A2, B1, B2 is respectively provided with a driving device PA1, PA2, PB1, PB2, each of which may feature at least one motor and one braking device. In the embodiment shown, each driving device PA1, PA2, PB1, PB2 comprises two motors M-a, M-b and a transmission that is coupled to the output sides of the first braking device M-a realized in the form of a hydraulic motor (reference symbol H) and of the second braking device M-b realized in the form of an electric motor M2 (reference symbol E) in such a way that the power made available by the hydraulic motor H and the power made available by the electric motor E are added up and transmitted to the rotary drive shafts 24-a, 24-b. The at least one braking device is functionally connected to the respectively assigned decentral control and monitoring device 5-A1, C-A2, C-B1, C-B2. The control and monitoring devices C-A1, C-A2, C-B1, C-B2 are realized in such a way that they actuate the at least one braking device B-a, B-b in order to lock the rotary shaft drive trains 24-a, 24-b under predefined circumstances and, in particular, when a critical fault is assigned to one of the components of the actuation system. The driving devices PA1, PA2, PB1, PB2 are realized in such a way that a malfunction of one of the two driving motors such as, e.g., the hydraulic motor H or the electric motor E in the embodiment shown can be compensated with the effect that the power output of the transmission is cut in half.

The integration of the load sensor S-D into the drive lever 130 makes it possible to route the cable for functionally connecting the load sensor S-D to the respectively assigned control and monitoring device 5, C-A1, C-A2, C-B1, C-B2 into the main wing and to the respectively assigned control and monitoring device 5, C-A1, C-A2, C-B1, C-B2 via the respective regulating flap K and via at least one of the bearing devices 141 of this regulating flap K. This embodiment of the cable routing may be realized in a bearing device with "Track kinematics," as well is in a bearing device with "Dropped-Hinge kinematics." In this way, a cable routing via the actuator is avoided and the cable routing can be realized with relatively simple plug connections between cable sections.

This cable routing is schematically illustrated in FIG. 3 with reference to a bearing device 141 with "Dropped-Hinge kinematics." The cable 200 extends from the load sensor S-D along the connecting device 135 and then into the interior of the regulating flap K through an opening. Alternatively, the cable 200 may also be routed from the joint 132 into an interior of a connecting device 135 and then into the regulating flap K. A collection point 210 may be provided within the regulating flap and the cable 200 arriving from the load sensor S-D may be combined with one or more other cables, in particular, for connecting sensors to the respective control and monitoring devices at this collection point as illustrated in an exemplary fashion in FIG. 2. From there, the cable 200 is routed to the bearing joint 212, by means of which the joint brace is coupled to the mounting brace 143, via at least one joint brace 145, 145a, 145b. In this case, the cable 200 may feature a plug connection 211 for connecting two cable sections of the cable 200 at the structural mounting or coupling of the joint brace 145 or one of the joint braces 145a, 145b in order to realize the regulating flap K such that it can be detached from the joint brace and therefore from its bearing device. The cable 200 then extends into the interior of the main wing H past the joint 144 and along the mounting brace 143. A plug connection between cable sections may also be provided on the joint 144. The joint brace 145, 145a, 145b and the mounting brace 143 may feature a hollow space with a cable guiding device, and the cable 200 may extend in the interior of the joint brace 145, 145a, 145b and in the interior of the mounting brace 143. The hollow space may be realized, in particular, with an empty tube that is arranged on the outer side of the joint brace 145, 145a, 145b and/or the mounting brace 143, installed into the joint brace 145, 145a, 145b and/or the mounting brace 143 or structurally integrated into the joint brace 145, 145a, 145b and/or the mounting brace 143.

In an actuation system with local control and monitoring devices 5-A1, C-A2, C-B1, C-B2, the cable 200 is routed to the control and monitoring device 5-A1, C-A2, C-B1, C-B2 that is respectively assigned to the corresponding flap K. In an actuation system with a central control and monitoring device 5, the cable 200 is routed to the same control and monitoring device 5.

The invention claimed is:

1. An actuation system of an aircraft, comprising a guiding device for an adjustable flap with a load sensor and a monitoring device with a function for monitoring the guiding device, wherein an interface to the load sensor and an interface to a driving device for adjusting the regulating flap are integrated into the monitoring device, wherein the monitoring device is realized in such a way that it determines or receives in-flight information that actively signals a predefined flight attitude and/or a predefined operational state of the aircraft;

wherein the monitoring device comprises a comparing function for carrying out a comparison between a load value that corresponds to a sensor value acquired by the load sensor and a limiting value that corresponds to a minimum operational load for the predefined flight attitude and/or the predefined operational state of the aircraft; and wherein the monitoring function is realized in such a way that it assigns a fault mode to the regulating flap if it is determined that the predefined flight attitude and/or the predefined operational state of the aircraft exists as a result of the comparison showing that the limiting value corresponding to the minimum operational load is not reached.

2. The actuation system according to claim 1, wherein the predefined flight attitude and/or operational state of the aircraft exists if at least one of the following conditions is fulfilled:
  the monitoring function determines or receives in-flight information as to the fact that the regulating flap is and/or has been moved into one of several selectable positions that is specially predefined for the assignment of the fault mode and/or
  at least a predefined time after generating an actuation command for the driving device in order to move the regulating flap into one of several selectable positions that is specially predefined for the assignment of the fault mode and/or
  the monitoring function determines or receives in-flight information as to the fact that a predefined aerodynamic angle of attack or loading state or flight weight exists.

3. The actuation system according to claim 1, wherein the limiting value that corresponds to a minimum operational load is specified in the form of a value that is lower than 70% of the permissible maximum load for flying operations at the location of the load sensor.

4. The actuation system according to claim 1, wherein the monitoring device is realized in such a way that, if a fault mode is assigned to a regulating flap, it no longer activates this regulating flap during the same flight.

5. The actuation system according to claim 1, wherein the monitoring device determines that a predefined flight attitude exists by comparing specified flight attitude data with acquired flight attitude data.

6. The actuation system according to claim 1, wherein the limiting value that corresponds to a minimum operational load has the value of a cruising load at the location of the load sensor that is acquired during the same flight by the at least one load sensor.

7. The actuation system according to claim 1, wherein the monitoring device is realized in such a way that the comparing function carries out a comparison between a sensor value acquired by the load sensor and a limiting value that corresponds to a minimum operational load, as well as a comparison between a sensor value acquired by the load sensor and a second limiting value that corresponds to a maximum operational load, and in that the monitoring function assigns a fault mode to the regulating flap if it is determined that the predefined flight attitude and/or the predefined operational state of the aircraft exists as a result of the comparison showing that the limiting value corresponding to the minimum operational load is not reached or the limiting value corresponding to the maximum operational load is exceeded.

8. The actuation system according to claim 1, wherein the first limiting value corresponding to a minimum operational load and the limiting value corresponding to a maximum operational load are respectively specified in such a way that the first limiting value amounts to less than half of the second limiting value for the maximum operational load.

9. An actuation system for a regulating flap of an aircraft according to claim 1, wherein the actuation system comprises:
  at least one driving device for adjusting regulating flaps; and
  at least two guiding devices that are spaced apart from one another in the wingspan direction of the regulating flap and serve for adjusting the regulating flaps, wherein each guiding device comprises: an actuator, a transmission mechanism for transmitting the power of the respectively assigned driving device and an actuation mechanism for kinematically coupling the actuator to the regulating flap;
  wherein at least one load sensor is functionally connected to the monitoring device and arranged on at least one guiding device of the guiding devices assigned to at least one regulating flap, namely on at least one regulating flap of the actuation system and on at least one guiding device, in order to determine that an operational load is not reached.

10. The actuation system according to claim 9, wherein the actuation system comprises at least two regulating flaps on each airfoil, wherein a first load sensor is arranged on the regulating flap situated closest to the fuselage, namely on the guiding device situated closest to the aircraft fuselage, and wherein a second load sensor is arranged on the regulating flap situated farthest from the fuselage, namely on the guiding device situated farthest from the fuselage.

11. The actuation system according to claim 9, wherein the monitoring device comprises a function that is realized in such a way that it assigns a fault mode to a regulating flap during the movement of the regulating flap into a predefined position if the sensor value acquired by the load sensor falls short of a first limiting value that corresponds to a minimum operational load or exceeds a second limiting value that corresponds to a maximum operational load.

12. The actuation system according to claim 9, wherein a position sensor that serves for determining the adjusted position of the regulating flap and is functionally connected to the control and monitoring device is respectively arranged on both guiding devices, and in that the control and monitoring device is realized in such a way that it compares the values acquired by the position sensors with one another and assigns a fault mode to a regulating flap during the movement of the regulating flap into a predefined position if the comparison shows that the difference between the values of the position sensors exceeds a minimum difference and if the sensor value acquired by the load sensor falls short of a first limiting value that corresponds to a minimum operational load or exceeds a second limiting value that corresponds to a maximum operational load.

13. The actuation system according to claim 9, wherein the load sensor is arranged on the input side or the output side of the actuator of the guiding device in order to acquire the load occurring on the output side of the actuator due to the actuation of the regulating flap.

14. The actuation system according to claim 9, wherein the load sensor comprises a sensor for measuring the longitudinal force occurring in a drive rod that is arranged between the actuator and the regulating flap in order to adjust the regulating flap as a result of the adjusting movement of the actuator.

15. The actuation system according to claim 9, wherein each guiding device comprises a drive rod, by which the actuator is coupled to the regulating flap, and in that the load sensor is arranged in a connecting bolt for coupling the drive rod to the regulating flap and realized in such a way that it measures a lateral force in the bolt that results from the force exerted by the regulating flap.

16. The actuation system according to claim 9, wherein the load sensor comprises a sensor for measuring a torque that occurs on an output shaft of the actuator and is intended for realizing an adjusting movement of the actuator in order to adjust the regulating flap.

17. The actuation system according to claim 9, wherein a plurality of load sensors are arranged on a guiding device of a regulating flap, wherein the sensor value of one load sensor or the sensor values of several load sensors is/are used for determining whether a limiting value is exceeded and/or not reached.

18. The actuation system according to claim 1, wherein the fault-tolerant actuation system comprises a central driving unit that is activated by the control and monitoring device and mechanically coupled to the guiding devices of each wing by a rotary shaft in order to realize their actuation.

19. The actuation system according to claim 9,
wherein at least two guiding devices are respectively connected to the at least one flap of each airfoil and spaced apart from one another in the wingspan direction of the, wherein the guiding devices are respectively coupled to the driving device assigned to the regulating flap by one respective driving connection; and
wherein the fault-tolerant actuation system comprises driving devices for driving the guiding devices, wherein one driving device is respectively assigned to each regulating flap and functionally connected to a control and monitoring device that activates this driving device.

20. The actuation system according to claim 9, characterized in that the guiding devices comprise of a bearing device and an adjusting device and the adjusting device comprises: the actuator, the transmission mechanism for transmitting the power of the respectively assigned driving device and an actuation mechanism for kinematically coupling the actuator to the regulating flap.

21. A method for reconfiguring an actuation system with adjustable regulating flaps with the following steps:
carrying out a comparison between a load value that corresponds to a sensor value acquired by the load sensor assigned to a regulating flap and a first limiting value that corresponds to a minimum operational load during a/each flight when the regulating flap is moved into a predefined position or when a control command for moving the regulating flap is generated or when it is determined that a predefined flight attitude exists; and
assigning a fault mode to the regulating flap if this limiting value is not reached.

* * * * *

UNITED STATES PATENT AND TRADEMARK OFFICE
CERTIFICATE OF CORRECTION

PATENT NO. : 8,868,261 B2
APPLICATION NO. : 13/790960
DATED : October 21, 2014
INVENTOR(S) : Recksiek et al.

It is certified that error appears in the above-identified patent and that said Letters Patent is hereby corrected as shown below:

On title page, item (60) Related U.S. Application Data replace "Provisional application No. 61/382,824, filed on Sep. 14, 2010"

with --Provisional application No. 61/380,824, filed on Sep. 8, 2010.--

Signed and Sealed this
Second Day of June, 2015

Michelle K. Lee
*Director of the United States Patent and Trademark Office*